United States Patent
Khotimsky et al.

(10) Patent No.: US 10,153,842 B2
(45) Date of Patent: Dec. 11, 2018

(54) EMULATING ROGUE OPTICAL NETWORK UNIT BEHAVIOR IN A PASSIVE OPTICAL NETWORK

(71) Applicant: Verizon Patent and Licensing Inc., Arlington, VA (US)

(72) Inventors: Denis A. Khotimsky, Westborough, MA (US); Zigmunds A. Putnins, Ridgewood, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2 days.

(21) Appl. No.: 15/438,157

(22) Filed: Feb. 21, 2017

(65) Prior Publication Data

US 2018/0241471 A1    Aug. 23, 2018

(51) Int. Cl.
| | |
|---|---|
| H04B 10/25 | (2013.01) |
| H04B 10/12 | (2006.01) |
| H04J 14/00 | (2006.01) |
| H04J 14/02 | (2006.01) |
| H04B 10/27 | (2013.01) |
| H04B 10/69 | (2013.01) |
| G02B 6/42 | (2006.01) |

(52) U.S. Cl.
CPC .......... *H04B 10/27* (2013.01); *G02B 6/4246* (2013.01); *H04B 10/69* (2013.01)

(58) Field of Classification Search
CPC ....... G02B 6/4246; H04B 10/27; H04B 10/69
USPC .................................................. 398/66, 43
See application file for complete search history.

(56) References Cited

U.S. PATENT DOCUMENTS

| | | | | |
|---|---|---|---|---|
| 5,724,344 A | * | 3/1998 | Beck ........................ | H04B 3/10 330/52 |
| 2004/0047633 A1 | * | 3/2004 | Hoshida .............. | H04B 10/505 398/102 |
| 2005/0158050 A1 | * | 7/2005 | Ridgway ............ | G02B 6/12019 398/79 |
| 2007/0183778 A1 | * | 8/2007 | Jung ................... | H04J 14/0226 398/72 |
| 2007/0206948 A1 | * | 9/2007 | Lee ......................... | H04J 14/02 398/71 |
| 2009/0196629 A1 | * | 8/2009 | Zheng .................. | H04B 10/504 398/193 |
| 2009/0226183 A1 | * | 9/2009 | Kang ..................... | G06E 3/001 398/158 |

(Continued)

OTHER PUBLICATIONS

ITU-T, "Rogue optical network unit (ONU) considerations," http://www.itu.int/itu-t/recommendations/rec.aspx?id=11322&lang=en, Feb. 2011, 16 pages.

*Primary Examiner* — Oommen Jacob (57) ABSTRACT

A device can include a first component to receive, from a first network device, a first upstream optical signal. The first upstream optical signal can be associated with a designated time slot of the first network device. The device can include a second component to receive, from the first component, the first upstream optical signal. The second component can split the first upstream optical signal into a second upstream optical signal and a third upstream optical signal. The second component can provide, to a second network device, the third upstream optical signal. The third upstream optical signal is not associated with the designated time slot of the first network device.

7 Claims, 9 Drawing Sheets

(56) References Cited

U.S. PATENT DOCUMENTS

| | | | | |
|---|---|---|---|---|
| 2009/0290880 A1* | 11/2009 | Huang | H04B 10/25137 | 398/115 |
| 2010/0111305 A1* | 5/2010 | Yuan | G01J 1/44 | 380/256 |
| 2010/0119232 A1* | 5/2010 | Byun | H04J 14/02 | 398/83 |
| 2010/0172648 A1* | 7/2010 | Longhurst | H04B 10/29 | 398/82 |
| 2011/0002698 A1* | 1/2011 | Cai | H04B 10/504 | 398/193 |
| 2011/0243560 A1* | 10/2011 | Minato | H04J 14/005 | 398/63 |
| 2012/0294621 A1* | 11/2012 | Mazzochette | H04B 10/2575 | 398/115 |
| 2013/0057948 A1* | 3/2013 | Simonneau | H04B 10/2972 | 359/341.2 |
| 2015/0249314 A1* | 9/2015 | Onaka | H04B 10/2918 | 359/337.1 |
| 2015/0304033 A1* | 10/2015 | Giorgi | H04J 14/0221 | 398/72 |
| 2016/0204877 A1* | 7/2016 | Brooks | H04B 10/29 | 398/208 |

* cited by examiner

EMULATING ROGUE OPTICAL NETWORK UNIT BEHAVIOR IN A PASSIVE OPTICAL NETWORK

BACKGROUND

A passive optical network (PON) can include an optical access network architecture based on a point-to-multipoint (P2MP) optical fiber topology with passive branching points. The optical fiber topology can be referred to as an optical distribution network (ODN). A PON system can utilize the ODN to provide connectivity between multiple central nodes, such as optical line terminals (OLTs), and multiple user nodes, such as optical network units (ONUs). The ONUs can utilize multiple bi-directional wavelength channels, where each wavelength channel includes a downstream wavelength and an upstream wavelength.

DETAILED DESCRIPTION OF PREFERRED EMBODIMENTS

The following detailed description of example implementations refers to the accompanying drawings. The same reference numbers in different drawings can identify the same or similar elements.

In a single-wavelength, TDM/TDMA PON system (e.g., ITU-T G.984 G-PON, G.987 XG-PON, or the like), each ONU can operate over a single fixed wavelength channel associated with a particular OLT channel termination (OLT CT) over a single ODN. The TDM/TDMA system can include a single OLT CT and multiple ONUs interconnected by an ODN that includes an optical feeder fiber (also known as a trunk fiber), a splitter, and multiple distribution fibers. The TDM/TDMA PON system can operate over a single bi-directional wavelength channel, where each wavelength channel can include a fixed downstream wavelength and a fixed upstream wavelength. The ONUs can support the same fixed downstream and upstream wavelengths.

Once a particular ONU is activated on the TDM/TDMA PON system, the particular ONU can interact with a unique OLT channel termination. Prior to transmitting upstream in the TDM/TDMA PON system, the particular ONU can be required to learn parameters (e.g., burst profile parameters) of an upstream burst (e.g., a preamble, delimiter sizes and patterns, or the like), that the OLT CT provides in a downstream broadcast management message. For example, the ONU can enter a synchronization stage of an activation cycle. While in the synchronization stage, the ONU can attain synchronization to a downstream signal and learn system, channel, and/or burst profile parameters via downstream transmission from the OLT CT.

As used herein, a transmission (e.g., a downstream transmission and/or an upstream transmission) can refer to an act of transmitting an optical signal or signals over the fiber by a transmitter (e.g., a downstream transmission provided by an OLT CT toward an ONU(s), an upstream transmission provided by an ONU toward an OLT CT). Additionally, as used herein, a downstream optical signal can refer to the continuous sequence of fixed-size physical frames transmitted by the OLT CT. Additionally, as used herein, an upstream burst can refer to a single time-bounded optical signal transmitted by an ONU.

In a time and wavelength division multiplexing (TWDM) PON system, an ONU can operate on multiple wavelength channels (e.g., one wavelength channel at a time). Each wavelength channel can be associated with a corresponding OLT CT, and the multiple wavelength channels can be multiplexed over a single ODN. The OLT CTs that form the TWDM PON system can physically belong to the same module within a single OLT, to different modules within a single OLT, or to different OLTs.

The multiple ONUs in a TWDM PON system can operate on a particular wavelength channel at any given time and can utilize TDM/TDMA mechanisms. An ONU in a TWDM PON system can be instructed by the OLT CT to switch from an original wavelength channel to a new wavelength channel. When the OLT CT provides such instructions, the ONU can leave multiple ONUs associated with the original wavelength channel, can retune an optical transceiver to specified downstream and upstream wavelengths, and can join multiple ONUs associated with the new wavelength channel.

When an ONU is newly activated or reactivated on a TDM/TDMA PON system, the ONU can enter a discovery stage of an activation cycle. While in the discovery stage, the ONU can declare a presence to an OLT CT by providing a globally unique identifier of the ONU (i.e., a serial number, a media access control (MAC) address, or the like, depending on a standard), and can wait for assignment of an ODN-specific logical identifier (ID).

Once the OLT CT assigns the logical ID to the ONU, the ONU can enter a ranging stage of the activation cycle. In the ranging stage, the ONU can be requested to perform one or more short upstream transmissions to allow the OLT CT to accurately measure a round-trip delay (e.g., a round-trip optical signal propagation time and a processing time) and to compute an equalization delay (e.g., extra time that the ONU can be required to delay transmission in order to compensate for differences in the round-trip propagation times between ONUs on the same ODN). Once the individual equalization delay is assigned to the ONU, the ONU can enter a regular operation stage, and can remain in the regular operation stage until the ONU is reset (e.g., by a user), is deactivated by the OLT CT, is disabled by the OLT CT, experiences a loss of connectivity to the OLT CT, or the like.

Once an OLT CT assigns respective equalization delays to the ONUs, the OLT CT can transmit grants to the ONUs. A grant can refer to a permission to use a designated time slot for upstream transmission. In this way, the ONUs can provide, to the OLT CT and based on respective grants, upstream bursts that are received serially by the OLT CT, such as in a non-overlapping and non-interfering manner (e.g., in association with a designated time slot of the ONU).

In some cases, an ONU (e.g., a "rogue" ONU) can exhibit behavior that is inconsistent with a standard or requirement based on software failure, hardware failure, and/or an external factor, such as a malicious intent. In such cases, the rogue ONU can cause interference and disruption of the PON system. For example, a rogue ONU that transmits upstream bursts outside of a designated time slot can cause performance issues, cause service outages for other ONUs, and/or render the entire PON system inoperable. As such, the development and/or efficacy of procedures for detecting, isolating, and/or mitigating interference events associated with rogue ONUs can affect performance and operation of the PON system.

Implementations described herein enable a rogue ONU emulator device to receive, from an ONU (e.g., an ONU that is not associated with rogue behavior), upstream bursts, and time-shift the upstream bursts such that various rogue behaviors are exhibited. In this way, implementations described herein enable isolation, detection, and/or mitigation procedures to be tested without requiring the actual presence of a rogue ONU on a PON system. By enabling such procedures to be tested, implementations described herein improve performance of a PON system, reduce an amount of time associated with PON system failures, reduce performance issues, etc.

Figure 1:
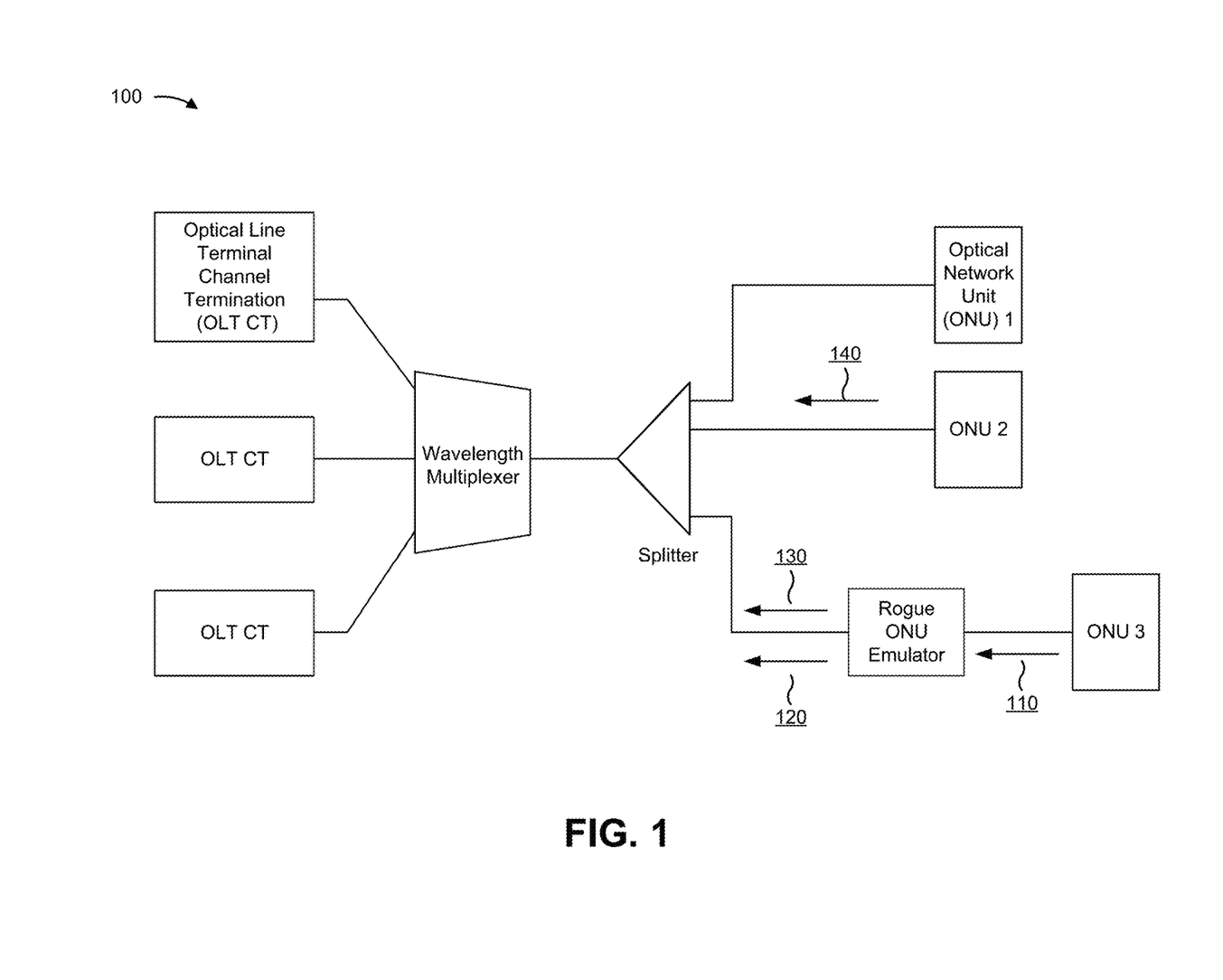
FIG. 1 is a diagram of an overview of an example implementation described herein.

FIG. 1 is a diagram of an overview of an example implementation 100 described herein. As shown in FIG. 1, and by reference number 110, a rogue ONU emulator can receive, from ONU 3, an upstream burst that is directed toward an OLT CT. For example, assume that ONU 3 transmits the upstream burst in association with a designated time slot of ONU 3.

In some implementations, and as described in more detail in connection with FIGS. 5-9, the rogue ONU emulator can include one or more components that enable the rogue ONU emulator to generate multiple upstream bursts based on an input upstream burst received from an ONU. For example, the rogue ONU emulator can split an input upstream burst into multiple upstream bursts that traverse rogue ONU emulator via different fiber segments that include different lengths and/or traverse different components of the rogue ONU emulator.

In some cases, and based on the length differential of the fiber segments, the multiple upstream bursts can be time-shifted such that one or more of the upstream bursts interferes with another upstream burst of another ONU, such as ONU 2 (e.g., is outside of a designated time slot of ONU 3). For example, as shown in FIG. 1, and by reference numbers 120 and 130, the rogue ONU emulator can provide multiple upstream bursts based on an input upstream burst from ONU 3. As shown by reference number 140, assume that ONU 2 transmits an upstream burst in association with a designated time slot of ONU 2. In this case, a time-shifted upstream burst, provided by the rogue ONU emulator, can interfere with the upstream burst of ONU 2.

In this way, implementations described herein enable procedures (e.g., detection, isolation, and/or mitigation procedures) to be tested by emulating rogue ONU behavior on a PON system. Additionally, implementations described herein enable such testing without requiring an ONU to actually exhibit rogue behavior.

Figure 2:
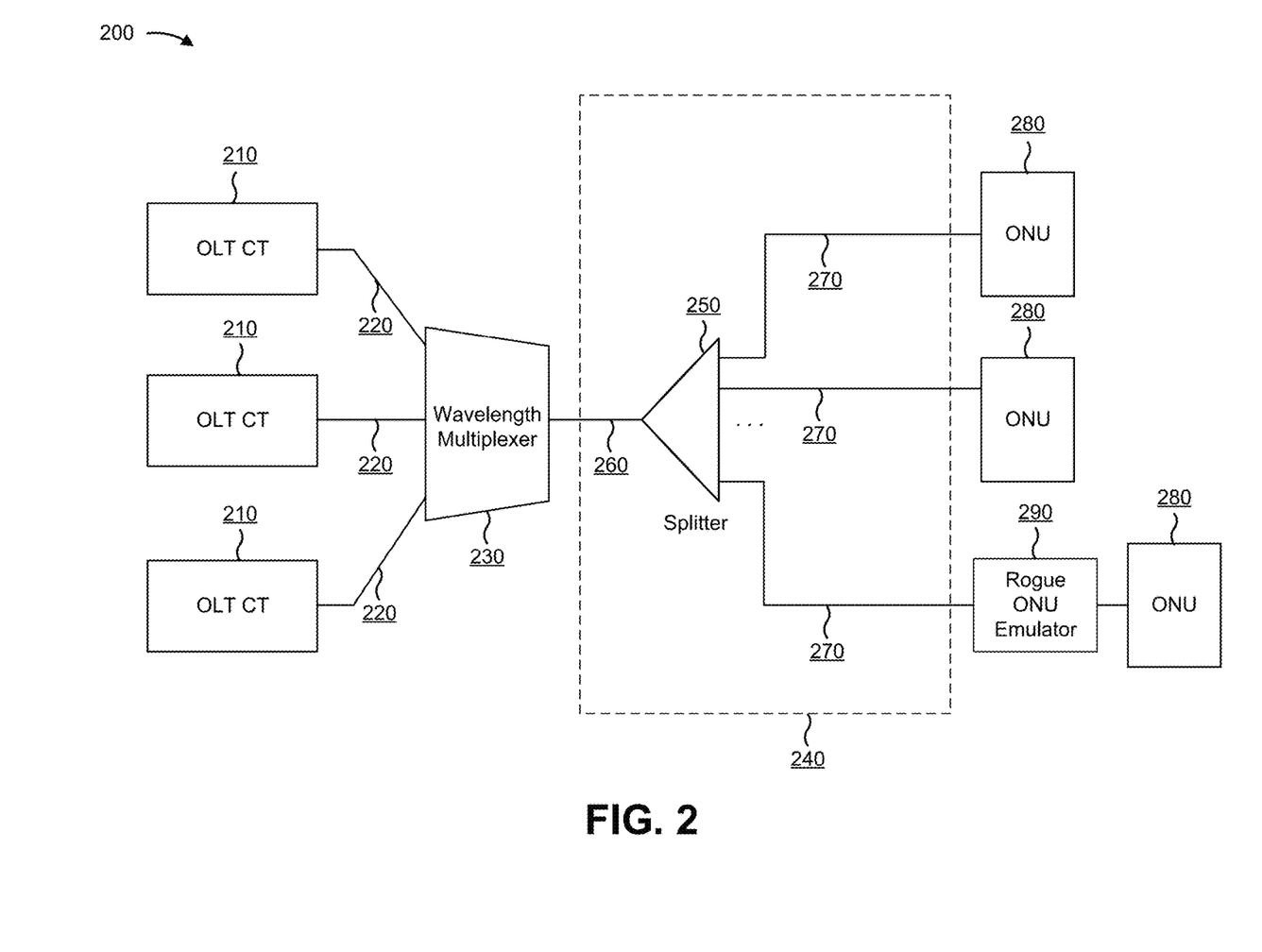
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more OLT CTs 210, channel attachment fibers 220, a wavelength multiplexer 230, an ODN 240, a splitter 250, an optical feeder fiber 260, distribution fibers 270, one or more ONUs 280, and a rogue ONU emulator 290.

OLT CT 210 includes one or more devices capable of serving as a service provider endpoint of a PON (e.g., environment 200). In some implementations, OLT CT 210 can perform conversion between electrical signals used by a service provider's equipment and fiber optic signals used by the PON. In some implementations, OLT CT 210 can coordinate multiplexing between conversion devices on the other end of the passive optical network (e.g., ONUs 280).

Wavelength multiplexer 230 includes one or more devices capable of multiplexing a number of optical carrier signals onto a single optical fiber by using different wavelengths (e.g., colors) of laser light. In some implementations, wavelength multiplexer 230 can enable bidirectional communications over one strand of fiber, as well as multiplication of capacity. In some implementations, each OLT CT 210 can connect to wavelength multiplexer 230 with a channel attachment fiber 220.

ODN 240 can include links (e.g., physical fiber) and optical devices that distribute optical signals in a PON. In some implementations, ODN 240 can utilize single mode optical fiber, optical splitters, and/or optical distribution frames that are duplexed so that upstream and downstream signals share the same fiber on separate wavelengths. In some implementations, ODN 240 can include splitter 250, an optical feeder fiber 260, and distribution fibers 270. Optical feeder fiber 260 can connect wavelength multiplexer 230 and splitter 250, and each distribution fiber 270 can connect a corresponding ONU 280 to splitter 250.

Splitter 250 includes one or more devices capable of splitting an optical signal (e.g., broadcast or downstream optical signals provided by OLT CT 210) into multiple optical signals. For example, in some implementations, splitter 250 can receive a single optical signal (e.g., a broadcast or downstream optical signal) from wavelength multiplexer 230, split the optical signal into three optical signals, and provide the three optical signals to one or more of ONUs 280. In some implementations, splitter 250 can receive one or more optical signals (e.g., upstream optical signals) from ONUs 280 (e.g., one from each ONU 280), and pass the one or more optical signals as a single optical signal to wavelength multiplexer 230.

ONU 280 includes one or more devices capable of terminating a PON (e.g., environment 200), and providing an interface between the PON and the customer's premises. In some implementations, ONU 280 can provide multiple service interfaces for the customer (e.g., an interface for voice services, an interface for data services, an interface for television services, or the like). ONUs 280 can provide, to OLT CTs 210, information using upstream optical signals. ONUs 280 can receive downstream optical signals provided by OLT CTs 210, and/or send the downstream optical signals to devices provided at the customer's premises. In some implementations, each ONU 280 can choose a single wavelength channel on which to operate and a single OLT CT 210 on which to subordinate, and can switch wavelength channels, if instructed by a respective OLT CT 210.

In some implementations, each OLT CT 210 and ONU 280 pair can be characterized by a corresponding fiber distance. The corresponding fiber distance can include a total length of fiber segments between the OLT CT 210 and ONU 280 pair (e.g., channel attachment fiber 220, optical feeder fiber 260, distribution fiber 270, and an equivalent fiber segment that simulates a delay across passive optical elements between the OLT CT 210 and ONU 280 pair). Since channel attachment fiber 220 is specific to a particular OLT CT 210, and distribution fiber 270 is specific to a particular ONU 280, the corresponding fiber distance can generally be unique for each OLT CT 210 and ONU 280 pair. Thereby, an optical signal propagation time between the OLT CT 210 and ONU 280 pair can be proportional to the corresponding fiber distance.

Rogue ONU emulator 290 includes one or more devices capable of emulating rogue ONU behavior while enabling downstream and upstream connectivity, between OLT CT 210 and ONU 280, to be maintained. For example, rogue ONU emulator 290 can include an optical node that can receive, from ONU 280, an input upstream optical signal (e.g., an upstream burst) and providing, to OLT CT 210, one or more upstream optical signals that are time-shifted such that the one or more time-shifted upstream optical signals interfere with another upstream transmission of another ONU 280.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
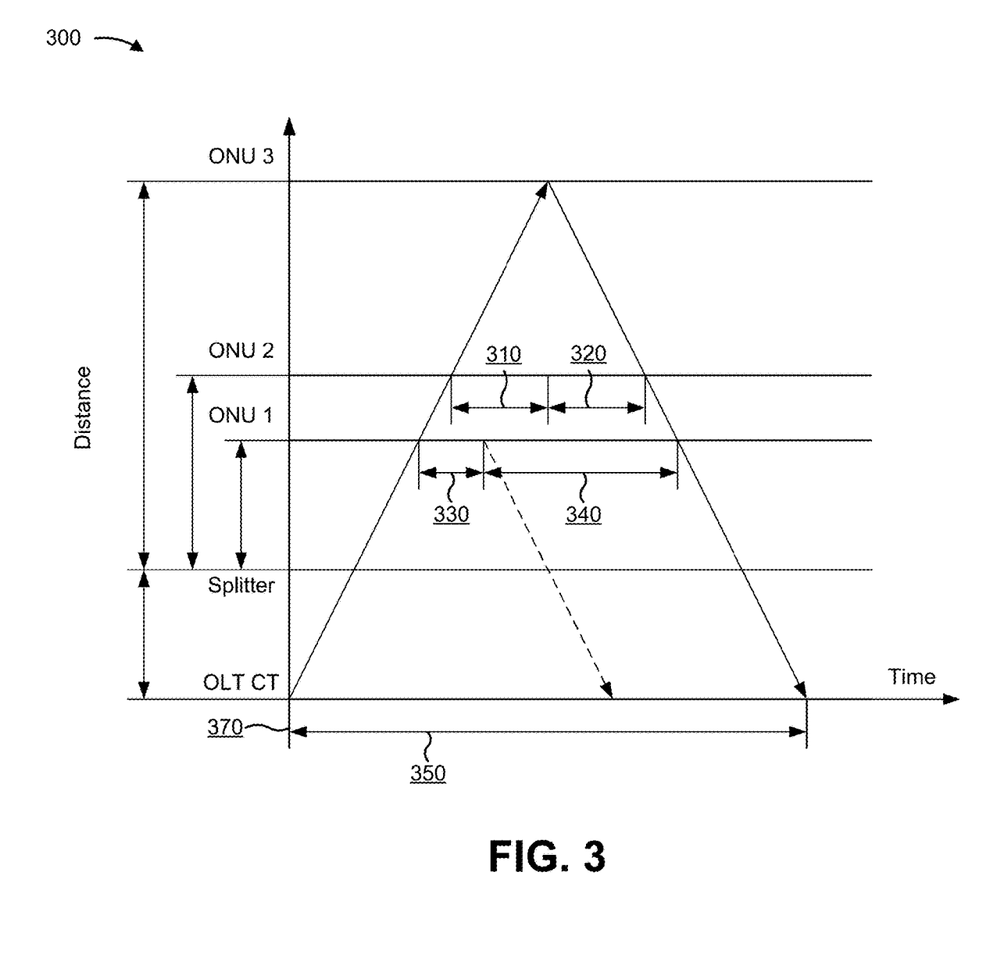
FIG. 3 is a diagram of an example equalization delay for an ONU in a time-division multiplexing (TDM) PON system.

FIG. 3 is a diagram 300 of an example equalization delay for an ONU in a TDM PON system. In a TDM/TDMA PON system, OLT CT 210 can direct the upstream transmissions of ONUs 280. For example, OLT CT 210 can direct the upstream transmissions by active ONUs 280 in such a manner that upstream bursts, of different ONUs 280, can arrive at OLT CT 210 serially and can be received without interfering with other upstream bursts of other ONUs 280. To do so, OLT CT 210 can assign respective equalization delay values to respective ONUs 280.

In some implementations, OLT CT 210 can establish an equalization delay value for ONU 280 based on performing a measurement of a round-trip optical signal propagation time. Additionally, or alternatively, OLT CT 210 can establish respective equalization delay values for ONUs 280 such that an effective round-trip delay is identical for each ONU 280. In some implementations, OLT CT 210 can provide, to respective ONUs 280, information that identifies respective equalization delay values. The process of round-trip optical signal propagation time measurement and equalization delay assignment can be referred to as ranging.

In some implementations, OLT CT 210 can measure a round-trip optical signal propagation time for each ONU 280, and assign respective equalization delay values to compensate for differences in the round-trip optical signal propagation times. As shown in FIG. 3, ONU 2 can be associated with a processing time 310 and an equalization delay 320, and ONU 1 can be associated with a processing time 330 and an equalization delay 340.

In some implementations, a value of an equalization delay of a hypothetical ONU 280 whose fiber distance and optical signal propagation time are both zero can be referred to as a zero-distance equalization delay 350 (e.g., as shown in FIG. 3) or an upstream physical frame offset. In some implementations, OLT CT 210 can select a value that corresponds to zero-distance equalization delay 350 prior to activating ONUs 280. Additionally, or alternatively, the value of zero-distance equalization delay 350 cannot be less than a sum of a round-trip optical signal propagation time and a processing time for an ONU 280 that is associated with the largest possible fiber distance from OLT CT 210 (e.g., ONU 3 as shown in FIG. 3).

In some implementations, in the TDM/TDMA PON system, time can be slotted and can be organized in fixed-size physical frames. A physical frame can have a fixed duration measured in seconds, milliseconds, microseconds, nanoseconds, or the like. In a downstream direction, each OLT CT 210 can continuously transmit physical frames, and can insert, at the start of each physical frame (e.g., shown as start 370 in FIG. 3), a physical synchronization block followed by a logical control header. In an upstream direction, the starts of upstream physical frames can form a sequence of reference points, and each reference point can be offset by a fixed amount with respect to the start of a corresponding downstream physical frame. From the perspective of OLT CT 210, an offset of each upstream frame with respect to the corresponding downstream frame can be equal to zero-distance equalization delay 350. In some implementations, a logical control header can include a bandwidth map. The bandwidth map can include instructions that instruct each ONU 280 to transmit an upstream burst and specify parameters of the burst (e.g., a size and an offset with respect to a commonly derived reference point, which is a start of the upstream physical frame, a preamble, a delimiter, or the like).

As indicated above, FIG. 3 is provided merely as an example. Other examples are possible and can differ from what was described with regard to FIG. 3.

Figure 4:
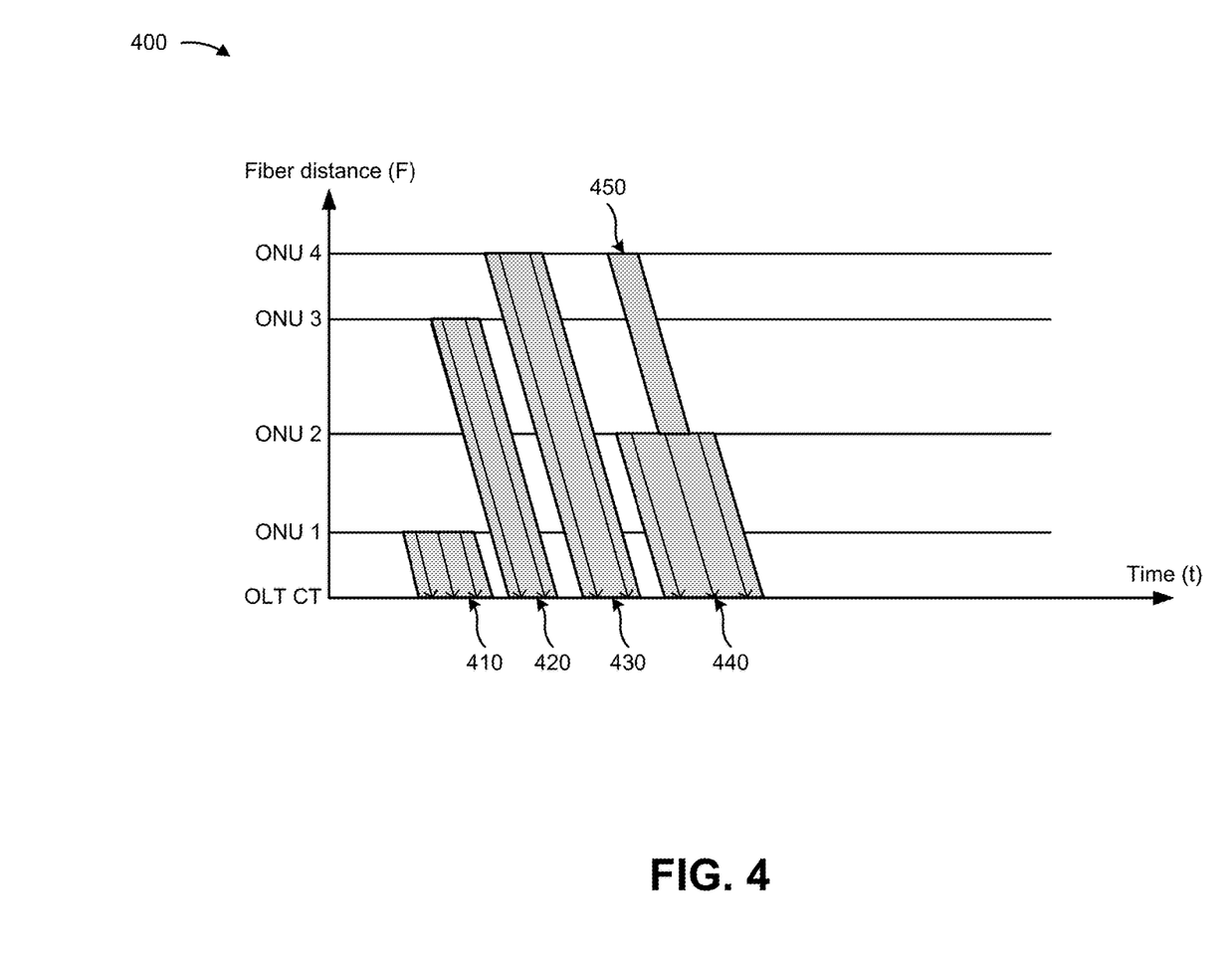
FIG. 4 is a diagram of an example time-division multiple access (TDMA) mechanism and an example of a rogue transmission.

FIG. 4 is a diagram 400 of an example TDMA mechanism and an example of a rogue transmission. For example, a TDMA mechanism can control upstream transmissions of ONUs 280. Each respective ONU 280 can transmit optical signals (e.g., upstream bursts) according to the time schedule specified in the bandwidth map. As an example, as shown in FIG. 4, OLT CT 210 can receive, respectively from ONU 1, ONU 3, and ONU 4, upstream bursts 410, 420, 430, serially and in a non-interfering manner. For example, ONU 1, ONU 3, and ONU 4 can respectively provide upstream bursts 410, 420, 430 according to designated time slots.

As further shown in FIG. 4, ONU 4 can provide a rogue upstream burst 450. For example, ONU 4 can transmit outside of a designated time slot of ONU 4, thereby interfering with upstream burst 440 of ONU 2 and thereby causing a rogue interference event. In this case, OLT CT 210 can employ a procedure to detect, isolate, and/or mitigate the rogue interference event. For example, OLT CT 210 can adjust time slots of ONUs 280 (e.g., to isolate a potential rogue ONU 280), can instruct ONUs 280 to prevent transmission, or the like.

As indicated above, FIG. 4 is provided merely as an example. Other examples are possible and can differ from what was described with regard to FIG. 4.

Figure 5:
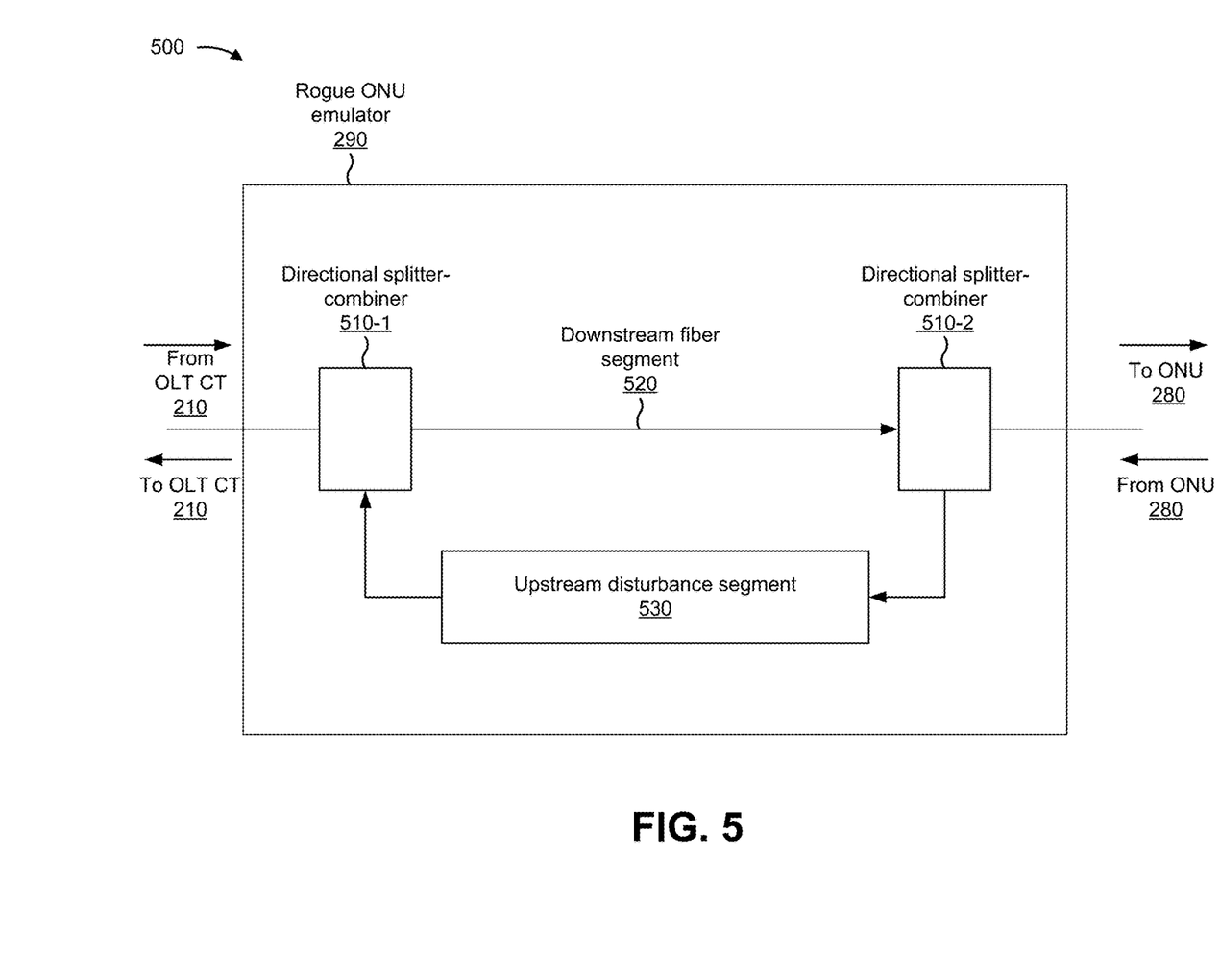
FIG. 5 is a diagram of example components of a rogue ONU emulator.
Figure 6:
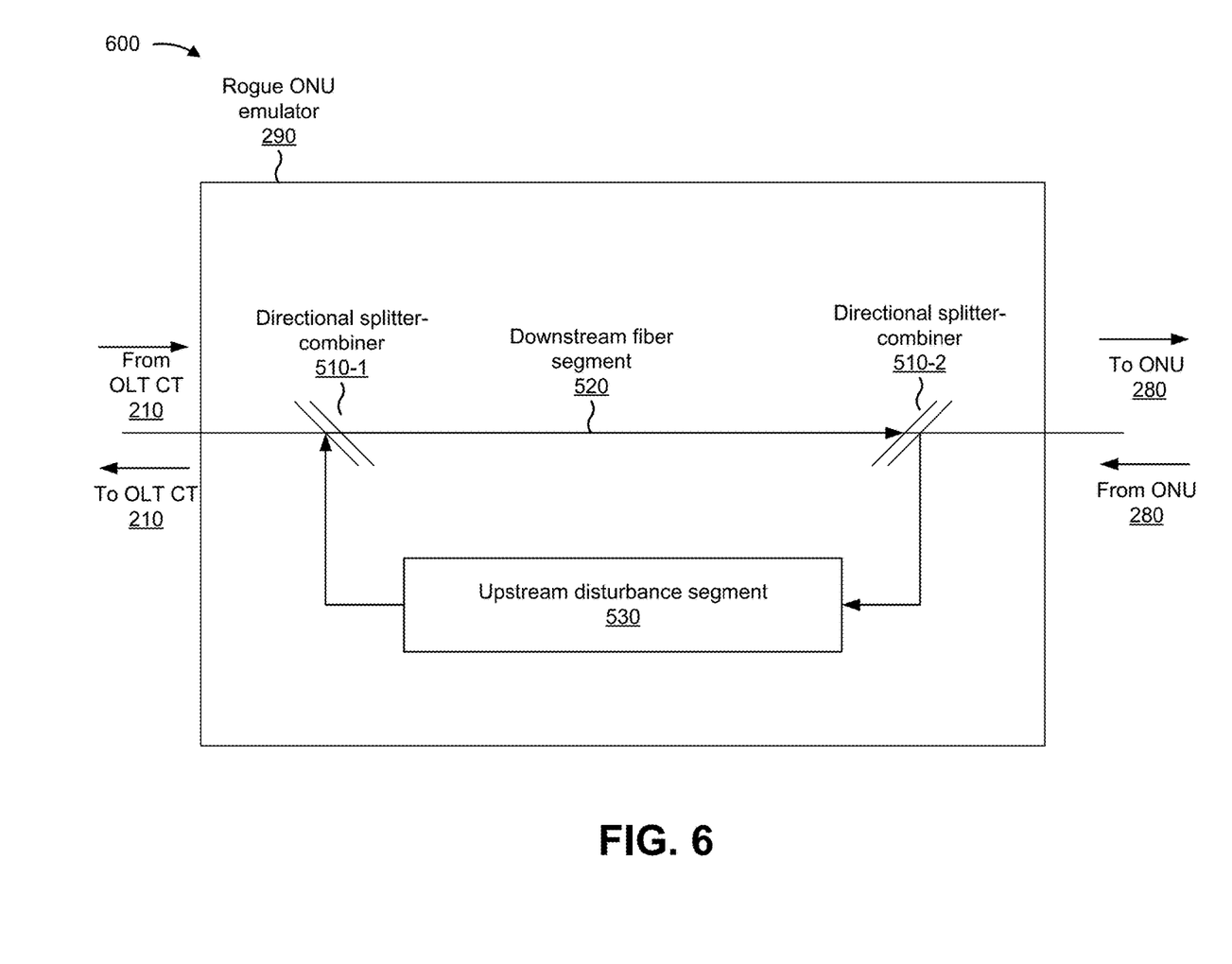
FIG. 6 is another diagram of example components of a rogue ONU emulator.
Figure 7:
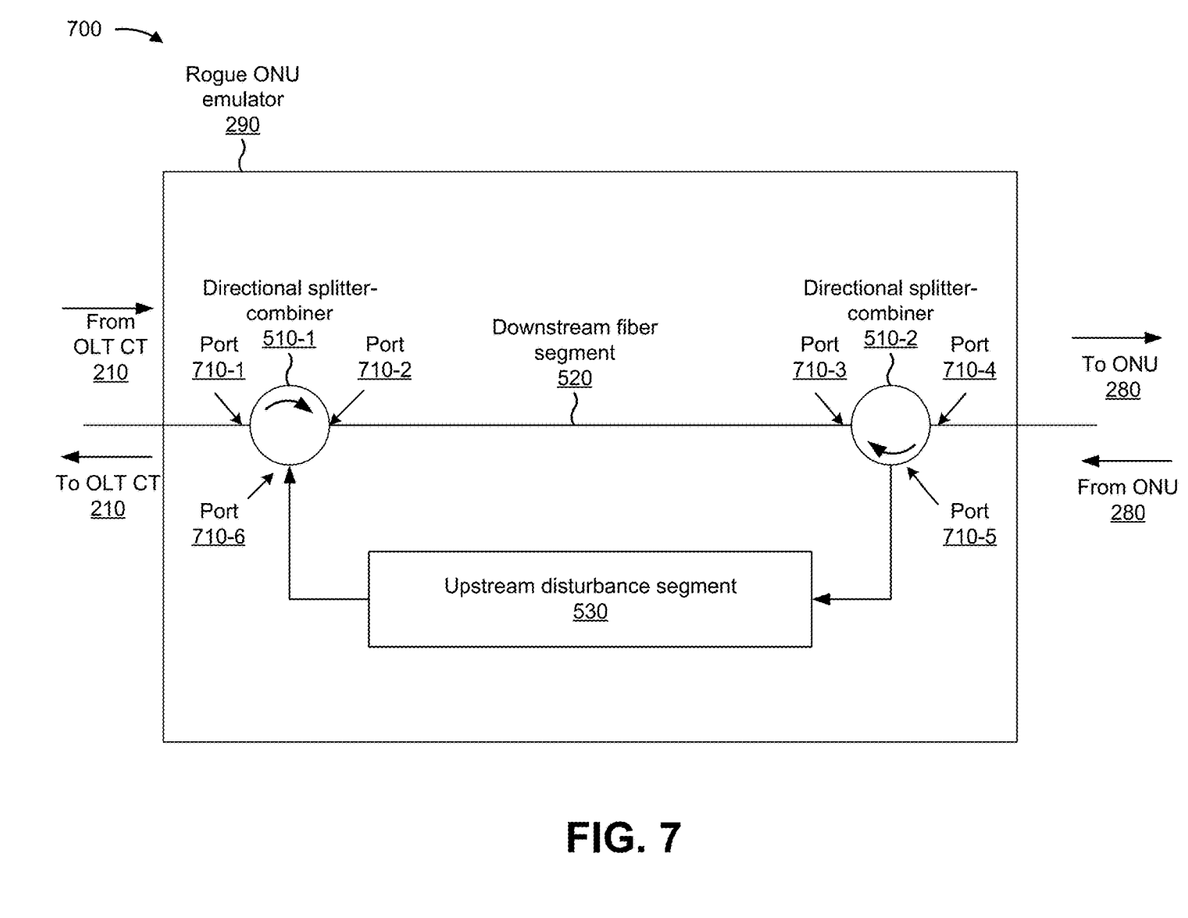
FIG. 7 is another diagram of example components of a rogue ONU emulator.

FIGS. 5-7 are diagrams 500, 600, and 700, respectively, of example components of rogue ONU emulator 290. As shown in FIG. 5, rogue ONU emulator 290 can include directional splitter-combiners 510-1 and 510-2, a downstream fiber segment 520, and an upstream disturbance segment 530. In some implementations, components of rogue ONU emulator 290 can interconnect via one or more optical fibers.

Directional splitter-combiner 510 includes one or more components capable of directing, splitting, and/or diffracting an optical signal in a particular direction or directions. For example, directional splitter-combiner 510 can include a mirror, a diffraction grating, a reflective grating, a circulator port, a beam splitter, or the like. In some implementations, directional splitter-combiner 510 can be positioned and/or configured to direct optical signals of different wavelengths in different directions. Additionally, or alternatively, directional splitter-combiner 510 can be positioned and/or configured to direct optical signals of different wavelengths toward different components of rogue ONU emulator 290.

In some implementations, directional splitter-combiner 510-2 can receive, from ONU 280, an upstream burst and direct the upstream burst toward upstream disturbance segment 530. Additionally, or alternatively, directional splitter-combiner 510-1 can receive, via upstream disturbance segment 530, an upstream burst and direct the upstream burst toward OLT CT 210.

In some implementations, directional splitter-combiner 510-1 can receive, from OLT CT 210, a downstream optical signal and direct the downstream optical signal toward directional splitter-combiner 510-2 and ONU 280 (e.g., via downstream fiber segment 520).

Downstream fiber segment 520 includes an optical link via which downstream optical signals are carried between directional splitter-combiner 510-1 and directional splitter-combiner 510-2. In some implementations, downstream fiber segment 520 provides fixed downstream connectivity between downstream ingress and egress of rogue ONU emulator 290. For example, downstream fiber segment 520 can enable fixed downstream connectivity between OLT CT 210 and ONU 280. As used herein, fixed connectivity can refer to connectivity that enables OLT CT 210 and ONU 280 to maintain connectivity, thereby preventing OLT CT 210 and/or ONU 280 from being required to perform an activation procedure (e.g., based on a loss of connectivity between OLT CT 210 and ONU 280).

Upstream disturbance segment 530 includes one or more components capable of providing multipath upstream connectivity between an upstream ingress and egress of rogue ONU emulator 290. For example, as described in more detail in association with FIG. 8 and FIG. 9, upstream disturbance segment 530 can include a fixed upstream fiber segment 820 and a variable (e.g., capable of being removed, replaced, inserted, etc.) fiber segment 850 of either longer or shorter length with respect to fixed segment 820, thereby enabling multipath upstream connectivity between an upstream ingress and egress of rogue ONU emulator 290.

In some implementations, and as shown in FIG. 6, directional splitter-combiner 510 can include a semi-transparent mirror. In some implementations, directional splitter-combiner 510 can reflect light that is associated with a particular wavelength. For example, directional splitter-combiner 510 can reflect light that is associated with an upstream wavelength band (i.e., a range of wavelengths at which ONU 280 can transmit upstream bursts). As a particular example, such as in an NG-PON2 system, directional splitter-combiner 510 can pass light that is associated with a downstream wavelength band of 1596 nanometers (nm) through 1603 nm, and can reflect light that is associated with an upstream wavelength band of 1532 nm through 1540 nm.

In this way, directional splitter-combiner 510-2 can receive an upstream burst and reflect the upstream burst toward upstream disturbance segment 530. Additionally, directional splitter-combiner 510-1 can receive a downstream optical signal and provide the downstream optical signal toward directional splitter-combiner 510-2 via downstream fiber segment 520 (e.g., enable the downstream optical signal to pass without reflecting the downstream optical signal).

In some implementations, and as shown in FIG. 7, directional splitter-combiner 510 can include an optical circulator (e.g., shown as a three-port optical circulator in FIG. 7). In some implementations, an optical circulator can include a component that can receive light via a first port and provide the light via a second port. That is, light that enters a port (e.g., port n) of an optical circulator can exit from the next port (e.g., port n+1) based on a predefined order.

In some implementations, and in reference to FIG. 7 and the downstream direction, a downstream optical signal can enter directional splitter-combiner 510-1 via port 710-1 and exit directional splitter-combiner 510-1 via port 710-2. For example, and as represented by the clockwise arrow, a predefined order can be port 710-1, port 710-2, port 710-6, port 710-1, port 710-2, etc. That is, an optical signal that enters a particular port 710 can egress from the next port 710 based on the predefined order.

Additionally, the downstream optical signal can reach directional splitter-combiner 510-2 via downstream fiber segment 520, enter directional splitter-combiner 510-2 via port 710-3, and exit directional splitter-combiner 510-2 via port 710-4. In this way, OLT CT 210 can provide, to ONU 280, downstream optical signals that travel through rogue ONU emulator 290 via downstream fiber segment 520 (e.g., do not traverse upstream disturbance segment 530).

In some implementations, and in reference to the upstream direction, an upstream burst can enter directional splitter-combiner 510-2 via port 710-4, and exit directional splitter-combiner 510-2 via port 710-5. Additionally, the upstream burst can travel through upstream disturbance segment 530, and reach directional splitter-combiner 510-1. In some implementations, the upstream burst can enter directional splitter-combiner 510-1 via port 710-6, and exit directional splitter-combiner 510-1 via port 710-1. In this way, ONU 280 can provide, to OLT CT 210, upstream bursts that travel through rogue ONU emulator 290 via upstream disturbance segment 530.

The number and arrangement of components shown in FIGS. 5-7 are provided as examples. In practice, rogue ONU emulator 290 can include additional components, fewer components, different components, or differently arranged components than those shown in FIGS. 5-7. For example, while rogue ONU emulator 290 is shown as including two directional splitter-combiners 510, a single downstream fiber segment 520, and a single upstream disturbance segment 530, in some implementations, rogue ONU emulator 290 can include a different number of directional splitter-combiners 510, downstream fiber segments 520, and/or upstream disturbance segments 530. Additionally, or alternatively, a set of components (e.g., one or more components) of rogue ONU emulator 290 can perform one or more functions described as being performed by another set of components of rogue ONU emulator 290.

Figure 8:
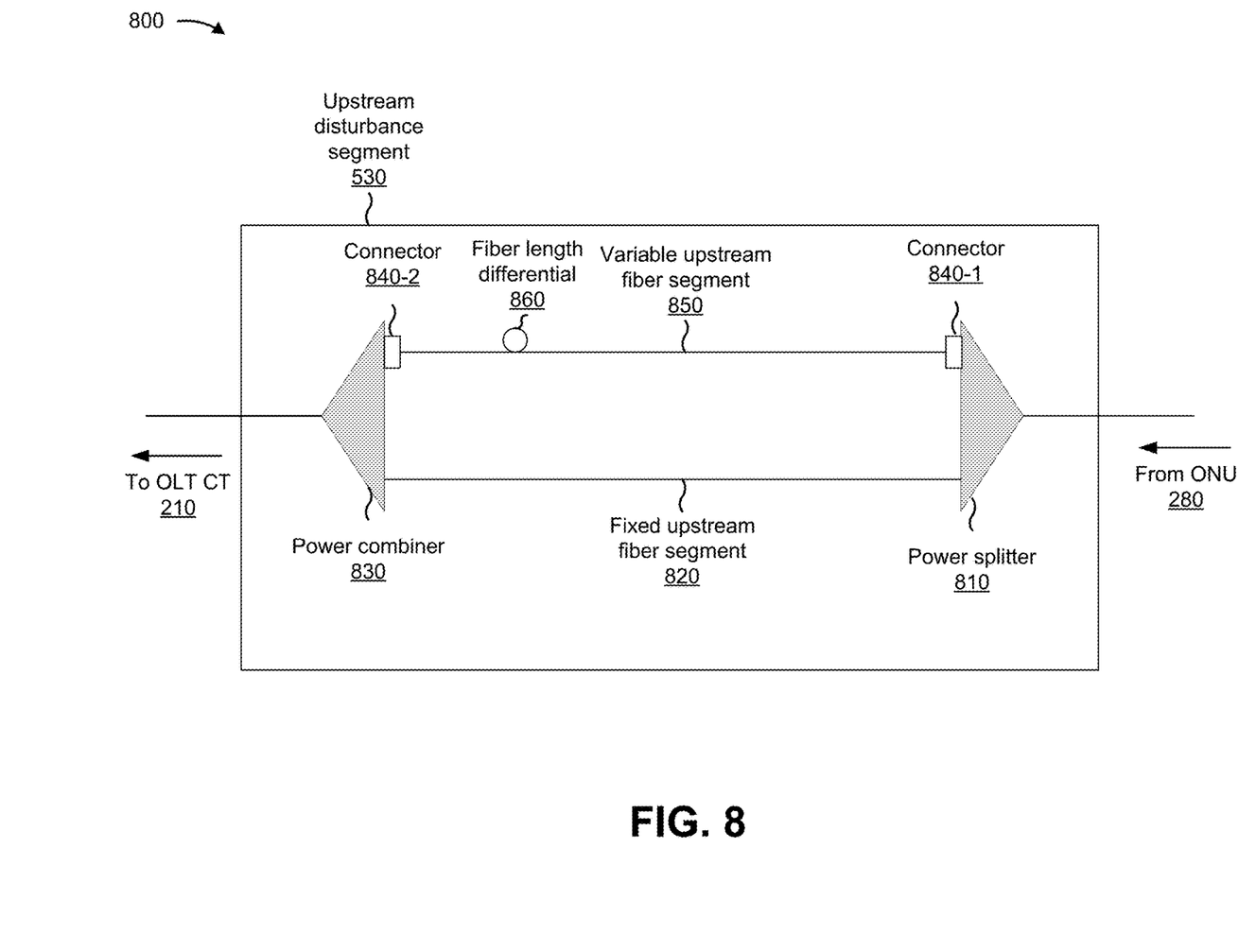
FIG. 8 is a diagram of example components of an upstream disturbance segment.

FIG. 8 is a diagram of example components of an upstream disturbance segment. As shown in FIG. 8, upstream disturbance segment 530 can include a power splitter 810, a fixed upstream fiber segment 820, a power combiner 830, connectors 840-1 and 840-2, and a replaceable variable upstream fiber segment 850 that includes a fiber length differential 860. In some implementations, components of upstream disturbance segment 530 can interconnect via one or more optical fibers.

Power splitter 810 includes one or more components capable of splitting power of an input upstream burst and providing the split upstream burst (e.g., copies of the input upstream burst) to multiple fiber segments. For example, power splitter 810 can receive an input upstream burst, split the upstream burst (e.g., into multiple upstream bursts), and provide a first upstream burst to power combiner 830 via fixed upstream fiber segment 820, and a second upstream burst to power combiner 830 via variable upstream fiber segment 850 (e.g., in situations where variable upstream fiber segment 850 is providing connectivity between power splitter 810 and power combiner 830).

Fixed upstream fiber segment 820 includes one or more optical links via which upstream bursts are carried between power splitter 810 and power combiner 830. In some implementations, fixed upstream fiber segment 820 provides fixed upstream connectivity between upstream ingress and egress of upstream disturbance segment 530. For example, fixed upstream fiber segment 820 can enable fixed upstream connectivity between ONU 280 and OLT CT 210. In this way, fixed upstream fiber segment 820 can enable fixed upstream connectivity between ONU 280 and OLT CT 210 despite a removal of variable upstream fiber segment 850. Additionally, in this way, fixed upstream fiber segment 820 can enable removal, replacement, etc. of variable upstream fiber segment 850 without requiring OLT CT 210 and/or ONU 280 to perform an activation procedure.

Power combiner 830 includes one or more components capable of combining power of input upstream bursts and providing the combined upstream burst (e.g., an upstream burst generated from one or more input upstream bursts).

Connector 840 includes one or more components capable of enabling variable upstream fiber segment 850 to provide connectivity between power splitter 810 and power combiner 830. Connector 840 also facilitates removal of variable upstream fiber segment 850.

Variable upstream fiber segment 850 includes one or more optical links via which upstream bursts are carried between power splitter 810 and power combiner 830. In some implementations, variable upstream fiber segment 850 is capable of providing connectivity between power splitter 810 and power combiner 830. In some implementations, variable upstream fiber segment 850 includes a length that is different than a length of fixed upstream fiber segment 820.

FIG. 8 provides an example of a possible arrangement of components. In particular, fiber length differential 860 is shown as representing a positive difference between the length of variable upstream fiber segment 850 and the length of fixed upstream fiber segment 820. In this case, power splitter 810 makes a first copy of the upstream burst, which travels over fixed upstream fiber segment 820 and can be perfectly timed. In this way, the first copy of the upstream burst can arrive to the OLT CT 210 earlier than a second copy of the upstream burst which travels over the variable upstream fiber segment 850 (e.g., which is longer than fixed upstream fiber segment 820).

As another example, and as an alternative to the component arrangement shown in FIG. 8, fixed upstream fiber segment 820 can be longer than variable upstream fiber segment 850. In this case, the first copy of the upstream burst, which travels over fixed upstream fiber segment 820 and is perfectly timed upon arrival at OLT CT 210, is delayed with respect to the second copy of the upstream burst which travels over the variable upstream fiber segment 850.

In some implementations, variable upstream fiber segment 850 can initially be disconnected from connector 840-1 and connector 840-2. That is, upstream disturbance segment 530 can include single path upstream connectivity between power splitter 810 and power combiner 830 via fixed upstream fiber segment 820. Additionally, ONU 280 and OLT CT 210 can perform an activation procedure (e.g., a synchronization phase, a discovery phase, a ranging phase, etc. as described elsewhere herein). In this way, OLT CT 210 can determine an equalization delay based on respective lengths of downstream fiber segment 520 and fixed upstream fiber segment 820, and assign a grant to ONU 280 based on the equalization delay.

In some implementations, variable upstream fiber segment 850 can be connected to connector 840-1 and connector 840-2 to enable multipath connectivity between power splitter 810 and power combiner 830. For example, variable upstream fiber segment 850 can be connected after ONU 280 and OLT CT 210 perform an activation procedure. In this case, rogue ONU emulator 290 can receive an upstream burst provided by ONU 280 toward OLT CT 210. Additionally, upstream disturbance segment 530 can receive the upstream burst via directional splitter-combiner 510-2. Further, power splitter 810, of upstream disturbance segment 530, can split the upstream burst and provide the split upstream bursts towards power combiner 830 via fixed upstream fiber segment 820 and variable upstream fiber segment 850. For example, power splitter 810 can split an input upstream burst into a first upstream burst and a second upstream burst (e.g., upstream bursts that are copies of the input upstream burst). In this way, as described below, a time-shift can occur based on the length differential of fixed upstream fiber segment 820 and variable upstream fiber segment 850.

In some implementations, upstream disturbance segment 530 can include multiple variable upstream fiber segments 850 of various lengths to introduce multiple upstream rogue copies of the upstream optical signal. That is, rogue ONU emulator 290 can include multipath upstream connectivity (e.g., two upstream paths, three upstream paths, four upstream paths, etc.).

In some implementations, the split upstream bursts can both be well-formed upstream bursts. A well-formed upstream burst (e.g., a well-formed optical signal) can refer to an upstream burst that complies with a particular protocol, standard, format, structure, requirement, or the like. For example, a well-formed burst can comply with a requirement for a message structure.

As used herein, a message structure can refer to a communication structure for communicating information, such as a protocol data unit (PDU), a network packet, a datagram, a segment, a block, a cell, a frame, a subframe, a slot, a symbol, a portion of any of the above, and/or another type of formatted or unformatted unit of data capable of being transmitted via a network.

In other words, OLT CT 210 can receive a well-formed upstream burst, parse information associated with the well-formed upstream burst (e.g., included in a packet header, payload, trailer, and/or another part of a message structure), and identify ONU 280 that provided the well-formed upstream burst. Alternatively, a non-well-formed burst can refer to an upstream burst that does not comply with a particular protocol, standard, requirement, format, structure, or the like. In other words, OLT CT 210 might not be capable of identifying ONU 280 that provides a non-well-formed upstream burst (e.g., the non-well-formed burst can include a non-discernible burst of optical power).

In some implementations, power combiner 830 can receive a first upstream burst via fixed upstream fiber segment 820, and provide the first upstream burst toward OLT CT 210. In some implementations, OLT CT 210 can receive the first upstream burst, and determine that the first upstream burst is not associated with an interference event. For example, ONU 280 can provide the first upstream burst in association with a designated time slot, and the first upstream burst can travel toward OLT CT 210 in accordance with a particular path that was used during the activation procedure (e.g., via fixed upstream fiber segment 820). In some implementations, the first upstream burst does not interfere with another upstream burst of another ONU 280.

In some implementations, power combiner 830 can receive a second upstream burst via variable upstream fiber segment 850, and provide the second upstream burst toward OLT CT 210. In some implementations, OLT CT 210 can receive the second upstream burst, and determine an interference event. For example, OLT CT 210 can determine that the second upstream burst interferes with another upstream burst provided by another ONU 280. As a particular example, variable upstream fiber segment 850 can include an additional one meter of fiber length than as compared to fixed upstream fiber segment 820. In this case, and in an NG-PON2 system including a transmission rate of 9.95328 Gigabits per second, the one meter length differential can correspond to a five nanosecond or fifty bit times of a time shift. In some implementations, a bit time can refer to an amount of time required to transmit one bit of data.

In this way, ONU 280 can provide, to OLT CT 210, an upstream burst in accordance with a designated time slot of ONU 280. Rogue ONU emulator 290 can receive the upstream burst, and provide a first well-formed upstream burst and a second well-formed upstream burst toward OLT CT 210. Additionally, OLT CT 210 can receive the second well-formed upstream burst, that travels via variable upstream fiber segment 850, and determine an interference event based on the second well-formed upstream burst interfering with another upstream burst of another ONU 280. Thereby, OLT CT 210 can perform a detection, isolation, and/or mitigation procedure to identify ONU 280 that provided the rogue upstream burst (e.g., the second well-formed upstream burst). In this way, implementations described herein enable the testing of detection, isolation, and/or mitigation procedures by introducing a time-shift in accordance with a transmission of ONU 280. Specifically, the implementation shown in FIG. 8 enables the testing of various procedures by introducing a well-formed upstream burst that interferes with another upstream burst of another ONU 280.

The number and arrangement of components shown in FIG. 8 are provided as an example. In practice, upstream disturbance segment 530 can include additional components, fewer components, different components, or differently arranged components than those shown in FIG. 8. For example, while upstream disturbance segment 530 is shown as including one power splitter 810, one fixed upstream fiber segment 820, one power combiner 830, two connectors 840, and one variable upstream fiber segment 850, in some implementations, upstream disturbance segment 530 can include a different number of power splitters 810, fixed upstream fiber segments 820, power combiners 830, connectors 840, and/or variable upstream fiber segments 850. Additionally, or alternatively, a set of components (e.g., one or more components) of upstream disturbance segment 530 can perform one or more functions described as being performed by another set of components of rogue ONU emulator 290.

Figure 9:
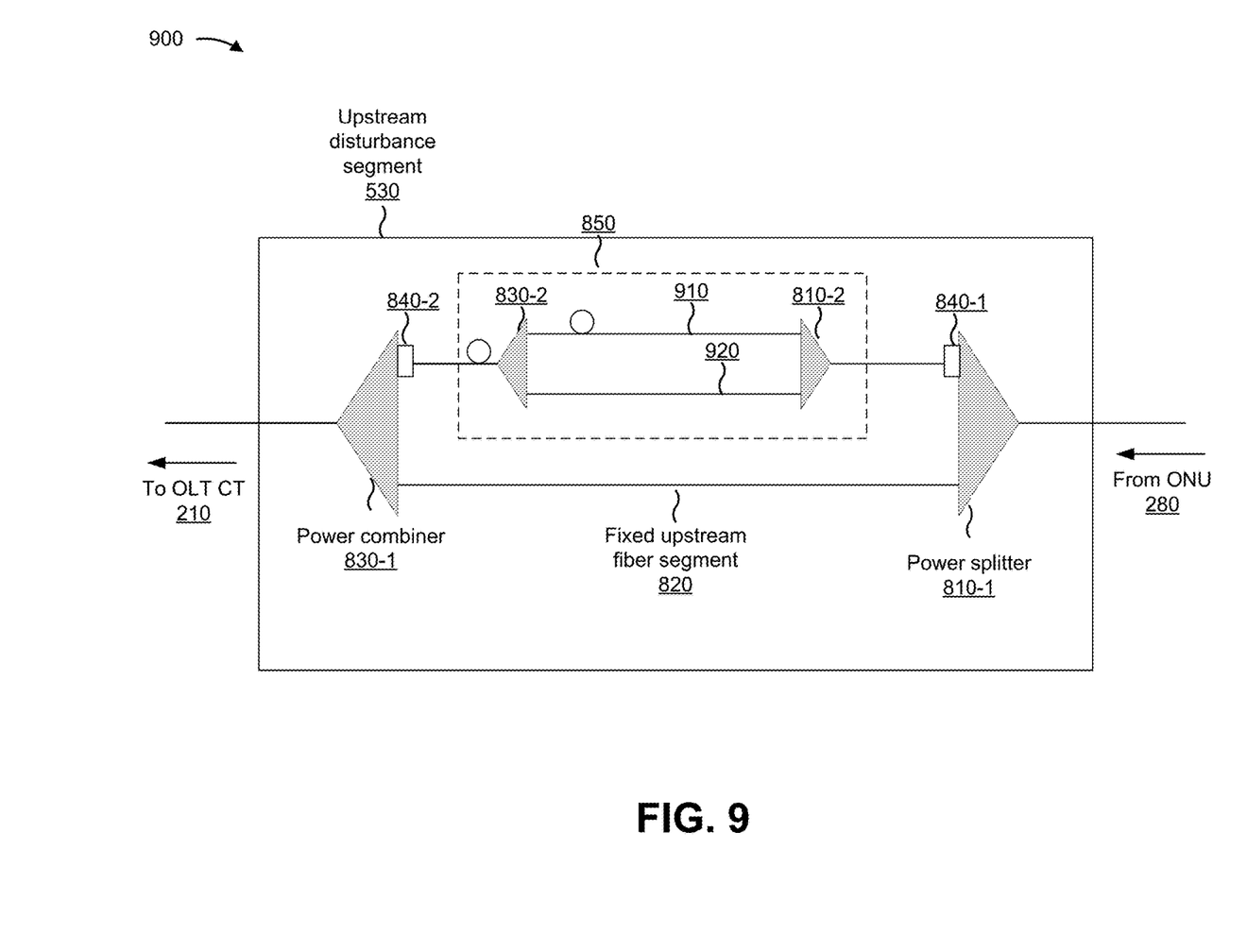
FIG. 9 is another diagram of example components of an upstream disturbance segment.

FIG. 9 is another diagram of example components of an upstream disturbance segment described herein. As shown in FIG. 9, upstream disturbance segment 530 can include power splitters 810-1 and 810-2, a fixed upstream fiber segment 820, power combiners 830-1 and 830-2, connectors 840-1 and 840-2, and a variable upstream fiber segment 850.

As shown in FIG. 9, variable upstream fiber segment 850 can include power splitter 810-2, power combiner 830-2, a first fiber segment 910, and a second fiber segment 920. In some implementations, components of upstream disturbance segment 530 can interconnect via one or more optical fibers.

In some implementations, power splitter 810-1, fixed upstream fiber segment 820, power combiner 830-1, and connectors 840-1 and 840-2 can include components and perform functions similar to that described above in connection with FIG. 8.

In some implementations, variable upstream fiber segment 850 can initially be disconnected from connectors 840-1 and 840-2, thereby enabling single path upstream connectivity between an ingress and egress of rogue ONU emulator 290, and enabling OLT CT 210 and ONU 280 to perform an activation procedure in a similar manner to that described above in connection with FIG. 8.

In some implementations, rogue ONU emulator 290 can include another component that is capable of adjusting a power level associated with an optical signal (e.g., increasing a power level, decreasing a power level, or the like). For example, rogue ONU emulator 290 can include a variable attenuator that can change a power level of the disturbing optical signal (e.g., that exhibits rogue behavior). In this way, detection, isolation, and/or mitigation procedures can be performed based on optical signals that include power levels that deviate from an intended configuration, or the like.

In some implementations, variable upstream fiber segment 850 can be connected via connectors to 840-1 and 840-2, thereby enabling multipath upstream connectivity between an ingress and egress of rogue ONU emulator 290 and enabling multipath upstream connectivity between power splitter 810-2 and power combiner 830-2.

In some implementations, rogue ONU emulator 290 can receive, from ONU 280, an upstream burst, and provide, via power splitter 810-1, split upstream bursts (e.g., a first upstream burst and a second upstream burst) toward fixed upstream fiber segment 820 and variable upstream fiber segment 850 respectively. In some implementations, variable upstream fiber segment 850 can receive the second upstream burst, and power splitter 810-2 can split the second upstream burst into a third upstream burst and a fourth upstream burst. In some implementations, the third upstream burst and the fourth upstream burst can both be well-formed upstream bursts.

In some implementations, the third upstream burst can travel toward power combiner 830-2 via a first fiber segment 910, and the fourth upstream burst can travel toward power combiner 830-2 via a second fiber segment 920. In some implementations, the first fiber segment 910 can include a fiber length that is different than a fiber length of the second fiber segment 920. In this way, a length differential between the first fiber segment 910 and the second fiber segment 920 can introduce a bit time shift between the third upstream burst and the fourth upstream burst.

In some implementations, power combiner 830-2 can receive and combine the third upstream burst and the fourth upstream burst, thereby forming a fifth upstream burst. In some implementations, the fifth upstream burst can include a non-well-formed burst. That is, OLT CT 210 might not be capable of parsing information associated with the fifth upstream burst to identify ONU 280 that provided the fifth upstream burst. For example, the fifth upstream burst can include a superposition of two mutually shifted copies (e.g., the third upstream burst and the fourth upstream burst) of a well-formed upstream burst (e.g., the second upstream burst). Additionally, or alternatively, OLT CT 210 can detect the fifth upstream burst as a non-discernible upstream burst of optical power, and might not be capable of identifying a particular ONU 280 that provided the fifth upstream burst (e.g., because the information associated with the fifth upstream burst is not associated with a well-formed format).

In this way, implementations described herein enable rogue ONU emulator 290 to generate a non-well-formed burst based on an input upstream burst from ONU 280. Additionally, in this way, implementations described herein enable OLT CT 210 and/or ONU 280 to perform a detection, isolation, and/or mitigation procedure based on a non-well-formed upstream burst. For example, OLT CT 210 can perform a mitigation procedure based on the non-well-formed burst (e.g., by instructing respective ONUs 280 to cease transmission, or the like). In this way, procedures for mitigating rogue behavior associated with non-discernible transmissions can be tested.

In this way, implementations described herein enable the testing of detection, isolation, and/or mitigation procedures by introducing a time-shift in accordance with a transmission of ONU 280.

The number and arrangement of components shown in FIG. 9 are provided as an example. In practice, upstream disturbance segment 530 can include additional components, fewer components, different components, or differently arranged components than those shown in FIG. 9. For example, while upstream disturbance segment 530 is shown as including two power splitters 810, one fixed upstream fiber segment 820, two power combiners 830, two connectors 840, and one variable upstream fiber segment 850, in some implementations, upstream disturbance segment 530 can include a different number of power splitters 810, fixed upstream fiber segments 820, power combiners 830, connectors 840, and/or variable upstream fiber segments 850. Additionally, or alternatively, a set of components (e.g., one or more components) of upstream disturbance segment 530 can perform one or more functions described as being performed by another set of components of rogue ONU emulator 290.

The foregoing disclosure provides illustration and description, but is not intended to be exhaustive or to limit the implementations to the precise form disclosed. Modifications and variations are possible in light of the above disclosure or can be acquired from practice of the implementations.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a first directional splitter-combiner to:
      receive, from a first network device associated with a passive optical network, a first optical signal, and
      provide, to a power splitter, the first optical signal;
   the power splitter to:
      receive the first optical signal and form a second optical signal and a third optical signal,
      provide, to a power combiner, the second optical signal via a first fiber segment, and
      provide, to the power combiner, the third optical signal via a second fiber segment,
      the power splitter including a first optical connector;
   the power combiner to:
      receive the second optical signal and the third optical signal, and
      provide, to a second directional splitter-combiner, the second optical signal and the third optical signal,
      the power combiner including a second optical connector,
      the second fiber segment being capable of connecting the power splitter and the power combiner via the first optical connector and the second optical connector, and
      the first fiber segment including a first length that is different than a second length of the second fiber segment; and
   the second directional splitter-combiner to:
      receive the second optical signal and the third optical signal, and
      provide, to a second network device associated with the passive optical network, the second optical signal and the third optical signal.

2. The device of claim 1, where the first directional splitter-combiner and the second directional splitter-combiner are semi-transparent mirrors.

3. The device of claim 1, where the first directional splitter-combiner and the second directional splitter-combiner are three-port optical circulators.

4. The device of claim 1, where the second directional splitter-combiner is to:
   receive, from the second network device, a fourth optical signal; and
   provide, to the first network device, the fourth optical signal via a third fiber segment.

5. The device of claim 1, further comprising:
   another power splitter to:
      receive the second optical signal and form a fourth optical signal and a fifth optical signal, and
      provide, to another power combiner, the fourth optical signal and the fifth optical signal; and
   the other power combiner to:

combine the fourth optical signal and the fifth optical signal to form the third optical signal, and provide, to the power combiner, the third optical signal.

6. The device of claim 1, where the second fiber segment is capable of distorting a timing of the second optical signal.

7. The device of claim 1, where the first network device is an optical network unit and where the second network device is an optical line terminal channel termination.

* * * * *